(12) United States Patent
Colgan et al.

(10) Patent No.: US 6,259,490 B1
(45) Date of Patent: *Jul. 10, 2001

(54) LIQUID CRYSTAL DISPLAY DEVICE

(75) Inventors: Evan George Colgan, Chestnut Ridge; James Lewis Levine, Yorktown Heights, both of NY (US); Mikio Kurihara, Yamato (JP); Satoshi Karube, Kamakura (JP); Kazumi Sakai, Moriyama (JP); Eisuke Kanzaki, Fujisawa (JP); Hiroshi Mishima, Shiga-ken (JP)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 27 days.

(21) Appl. No.: 09/140,641

(22) Filed: Aug. 26, 1998

Related U.S. Application Data

(60) Provisional application No. 60/096,944, filed on Aug. 18, 1998.

(51) Int. Cl.[7] .................................................. G02F 1/1335
(52) U.S. Cl. .............................................................. 349/12
(58) Field of Search .................................. 349/23, 24, 12; 345/173, 174, 175

(56) References Cited

U.S. PATENT DOCUMENTS

| 4,198,539 | * | 4/1980 | Pepper, Jr. ............................. 178/18 |
| 5,365,461 | * | 11/1994 | Stein et al. ............................ 364/550 |
| 5,465,103 | * | 11/1995 | Yoshioka .............................. 345/104 |

FOREIGN PATENT DOCUMENTS

| 59-33076 | 2/1984 | (JP) . |
| 61-174587 | 8/1986 | (JP) . |
| 62-86328 | 4/1987 | (JP) . |
| 62-84020 | 5/1987 | (JP) . |
| 62-181926 | 11/1987 | (JP) . |
| 5-19233 | 1/1993 | (JP) . |

* cited by examiner

*Primary Examiner*—James A. Dudek
(74) *Attorney, Agent, or Firm*—Scully, Scott, Murphy & Presser; Marian Underweiser, Esq.

(57) ABSTRACT

The present invention provides a liquid crystal display device having a position detecting function with a high sensitivity and a high resolution. The position detecting function comprises a position detecting electrically conductive film on a polarizer or a color filter glass substrate of the liquid crystal display device. The present invention also can suppress the undesired generation of an air gap between the polarizer and color filter glass substrate by using a polarizer that is smaller in size relative to the position detecting electrically conductive film.

11 Claims, 5 Drawing Sheets

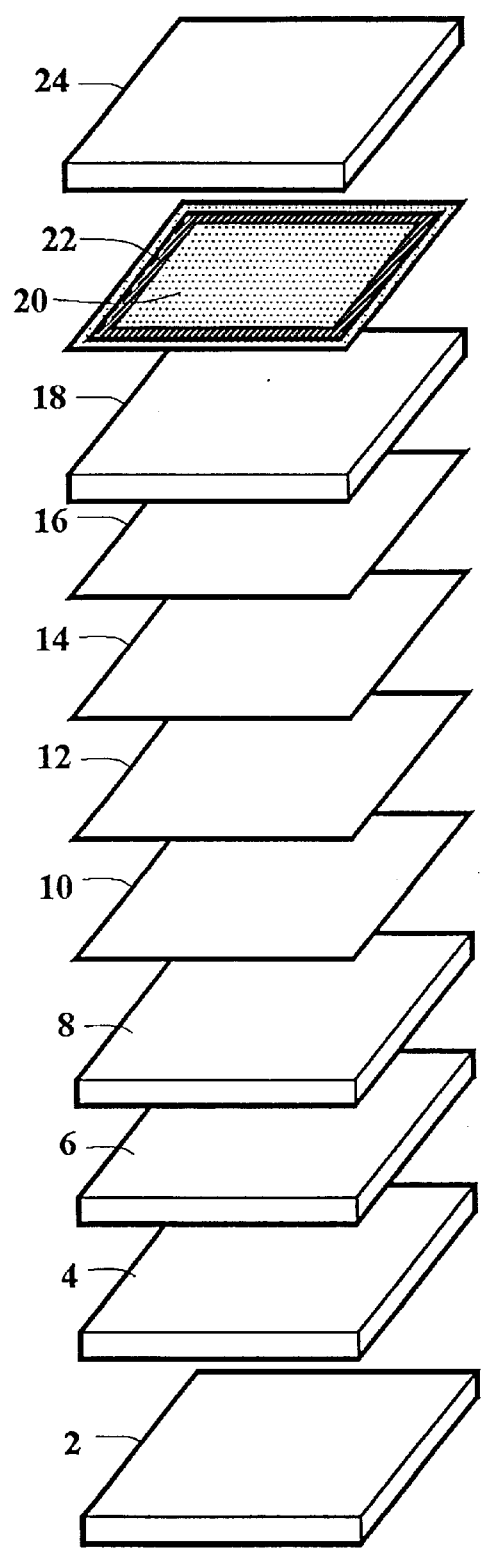
F I G. 1

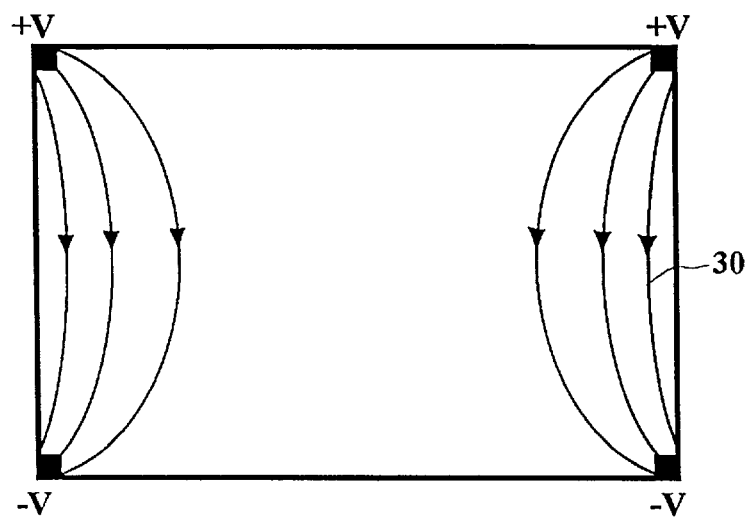
F I G. 4
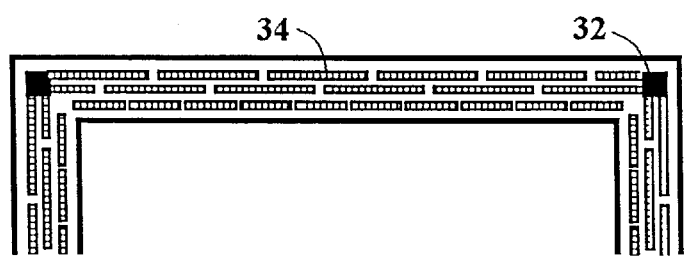
F I G. 5
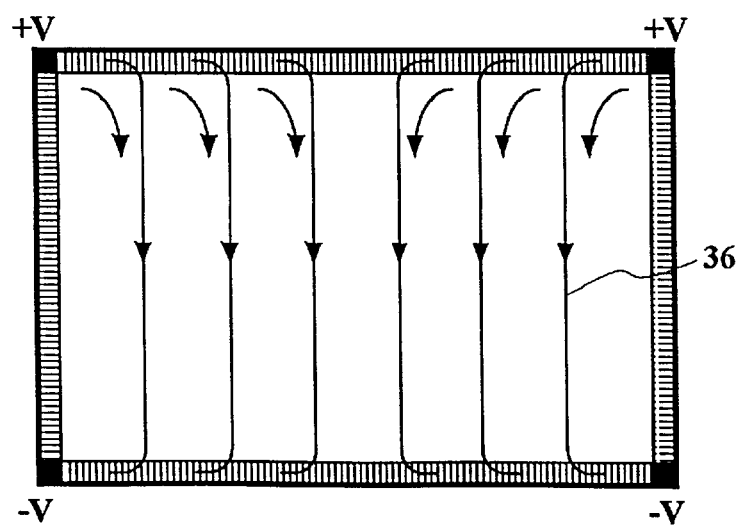
F I G. 6

LIQUID CRYSTAL DISPLAY DEVICE

CROSS-REFERENCE TO RELATED APPLICATIONS

The present application claims priority from U.S. Provisional Patent Application Ser. No. 60/096,944, filed on Aug. 18, 1998, and is related to U.S. patent application Ser. No. 09/140,641, filed on Aug. 18, 1998, both commonly assigned to the assignee of the present invention, herein incorporated by reference in their entirety.

DETAILED DESCRIPTION OF THE INVENTION

1. Field of the Invention

The present invention relates to a liquid crystal display device including a means for detecting a position to which a pen or a finger of an operator touches.

2. Background Art

Display devices using various schemes for detecting a touched position as described in NIKKEI BYTE, p.285, May 1998, and Monthly Display pp.76–103, July 1996. Such schemes include an analog capacity coupling scheme, a resistive film scheme, an infrared ray scheme, an ultrasonic wave scheme, etc. Such position detecting mechanisms are typically referred to as touch panels. To use the touch panel in the display device, a glass substrate used as the touch panel is overlapped on a screen of an image display device, such as a CRT, as in the case of an ATM (automatic teller machine). Accordingly, the size of the touch panel is larger than the size of the image display device by at least the size of touch sensors.

In the resistive film scheme, two resistive films are disposed to face each other, and a touched position is detected by contacting portions of both the resistive films contacted by a pen. In one way of the resistive film scheme, a resistive sheet made of two adhered resistive films is adhered on the screen of the image display device by an adhesive. However, it is impossible to achieve a high resolution in the resistive film scheme. A Japanese Published Unexamined Patent Application 9-322013 discloses a remote control unit in which a pressure sensitive film forming a resistive pressure sensor is integrally overlapped on the liquid crystal display device with a detecting precision of about 1 mm.

A Japanese Published Unexamined Patent Application 46-21879 discloses an electrical tablet device including an electrically conductive square sheet having electrically conductive electrode devices provided at four corners.

U.S. Pat. No. 4,198,539 discloses a touch sensor of the analog capacity coupling scheme and a linearization pattern provided on an outer peripheral portion.

U.S. Pat. No. 5,365,461 discloses an alternate use of a finger and a pen as an input device of the touch sensor of the analog capacity coupling scheme.

To combine a prior touch sensor with a portable type image display device such as a liquid crystal display device, the touch sensor has been overlapped on a screen of the liquid crystal display device. The problem caused in this case is that a thickness and weight of the liquid crystal display device become large due to a thickness of the touch sensor itself. In addition, the image quality is degraded.

SUMMARY OF THE PRESENT INVENTION

The present invention relates to a liquid crystal display device which comprises: a liquid crystal layer; a pair of substrates, one of the substrates being disposed at one side of the liquid crystal layer and the other of the substrates being disposed at the other side of the liquid crystal layer; a polarizer disposed on the outside of one of the substrates; and a an electrically conductive film, disposed between the polarizer and substrate, for detecting position of an input device based upon signals applied to the film. The film may be integrally disposed on the substrate or integrally disposed on the polarizer. A linearization pattern may be formed on an outer peripheral region of the film. The input device may be a human finger or a touch pen.

Further, the present invention relates to the liquid crystal display device, wherein the film is integrally disposed on the substrate, and the size of the polarizer adjacent to the substrate is smaller than the size of the film.

BRIEF DESCRIPTION OF THE DRAWINGS

FIG. 1 shows the general structure of the liquid crystal display device of the present invention.

FIG. 4 shows the linearization pattern.

FIG. 5 shows the linearization pattern.

FIG. 6 shows the linearization pattern.

DETAILED DESCRIPTION OF THE PRESENT INVENTION

Figure 2:
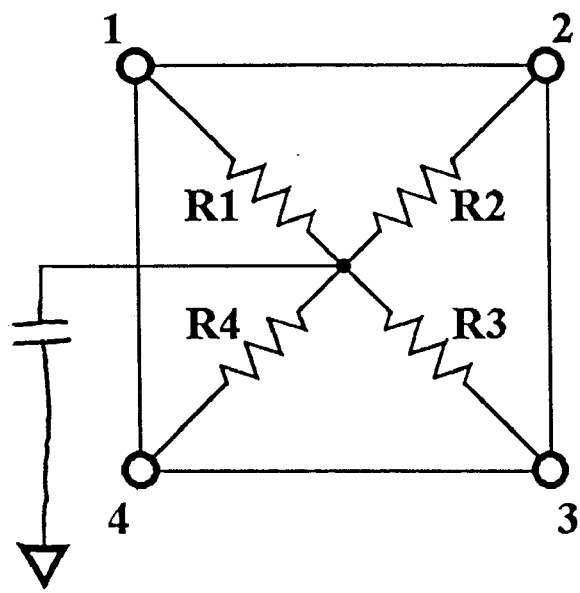
FIG. 2 show the analog capacity coupling scheme.

FIG. 1 shows one example of the liquid crystal display device provided with the touch sensor of the present invention. A liquid crystal layer 12 is sandwiched between a glass substrate 8 and a glass substrate 18. The two substrates 8 and 18 are made of the glass material, and the substrate 8 is called as a cell glass, and the substrate 18 is called as a color filter glass. A TFT array 10 is formed on a surface of the substrate facing to the liquid crystal layer 12, in which the electrodes for each PEL (picture element) are arranged. A color filter layer 16 and an Indium Tin Oxide (ITO) layer 14 operated as a common electrode are formed on a surface of the glass substrate 18 facing to the liquid crystal layer 12. A polarizer 6, a diffusion sheet 4 and a backlight 2 are disposed on an opposite surface of the substrate 8 to the liquid crystal layer 12. A polarizer 24 is disposed on an opposite surface of the substrate 18 to the liquid crystal layer 12. The structure just described is the structure of the prior liquid crystal display device broadly used in the art. In accordance with the present invention, a position detecting electrically conductive film 20 is added. Although FIG. 1 shows the example in which the position detecting electrically conductive film 20 is provided between the substrate 18 and the polarizer 24, the position detecting electrically conductive film 20 can be integrally provided on front or rear surface of the substrate 18 or the polarizer 24. Considering the capability of detecting the position, the position detecting electrically conductive film 20 can be integrally provided on the other substrate 10 or the polarizer 6. However, it is preferable to provide the position detecting electrically conductive film 20 at a position proximity to the polarizer 24 rather than a position adjacent to the ITO film 14 to increase an accuracy of the position detecting operation and to decrease an undesired electrical effects on the liquid crystal layer 12. In the case that the position detecting electrically conductive film 20 is formed at the position adjacent to the ITO film 14, it is necessary to insert an electrically insulating film between the position detecting electrically conductive film 20 and the ITO film 14. In the case that the position detecting electrically conductive film 20 is disposed between the substrate 18 and the color filter layer 16, the color filter layer itself operates as the insulating layer. In addition, a layer of low dielectric constant material may be disposed between the position detecting electrically conductive film 20 and the ITO film 14 in addition to the color filter layer to increase the insulating function by reducing the capacitance. As described above, the present invention is not limited to the structure in which the position detecting electrically conductive film 20 is directly and integrally mounted on the polarizer 24 or the substrate 18, and the present invention is realized in the structure in which the position detecting electrically conductive film 20 is integrally mounted on the polarizer 24 or the substrate 18 through the color filter layer 16 or another layer.

More preferably, the position detecting electrically conductive film 20 is disposed between the polarizer 24 and the substrate 18. Typically, the upper surface of the polarizer is a rugged surface formed by a non-gloss process. In this case, it may be difficult to form an uniform position detecting electrically conductive film. In the case that the position detecting electrically conductive film is formed on the surface of the polarizer, it is necessary to form an additional protection layer. But, if the position detecting electrically conductive film is formed between the polarizer 24 and the substrate 18, the polarizer itself operates as the protection film.

Next, the method for detecting the position in accordance with the present invention is described. In the analog capacity coupling scheme, the touch sensor is formed by coating the glass with the position detecting electrically conductive film, and forming the electrodes at the four corners of the glass. An electric field of low voltage is uniformly distributed over the position detecting electrically conductive film by applying an voltage to the electrodes at the four corners. The touch at a position of the sensor surface capacitively couples the underlying conductive film to ground. The coupling capacitances in the case that the finger of the operator touches the surface of the polarizer 24 of FIG. 1 are the capacitance through the polarizer in series with the capacitance of the operator's body to earth ground. Each of resistive values between the touched portion and the respective electrodes at the four corners is proportional to a distance between the touched portion and the electrode. Accordingly, at each of the electrodes at the four corners, a current proportional to the distance between the touched portion and the electrode is detected. The position is detected by calculating a positional coordinate of the touched portion based upon the currents detected by the respective electrodes. The value of current detected in this scheme is about several micro amperes, and a detection accuracy of about 1 nano amperes is required.

Figure 3:
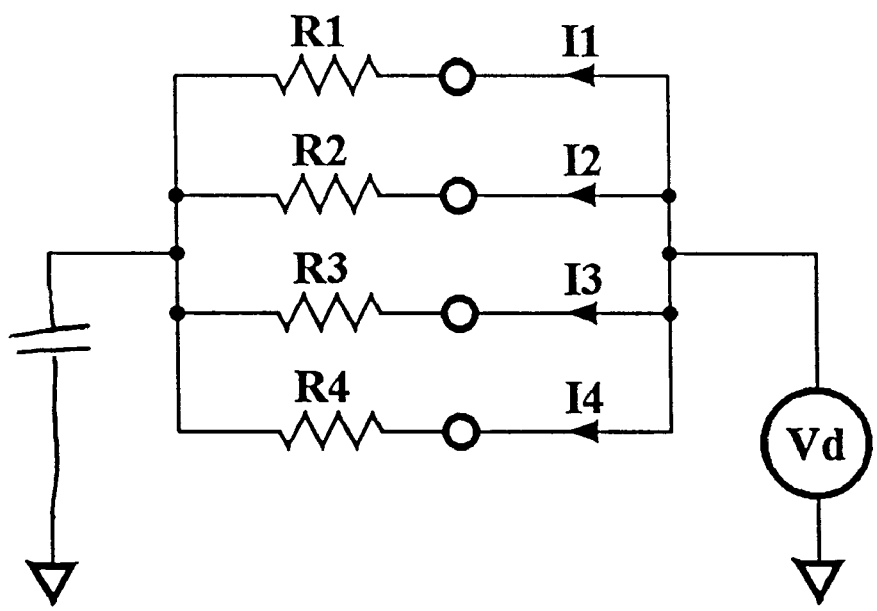
FIG. 3 shows the analog capacity coupling scheme.

FIG. 2 shows a circuit including resistors R1, R2, R3 and R4 between the touched portion and the respective electrodes at the four corners, and FIG. 3 shows an equivalent circuit thereof. In the case that the electric field of the low voltage distributed over the position detecting electrically conductive film is perfectively uniform, the positional coordinates can be calculated by the following equations.

$$X=[(I2+I3)-(I4+I1)]/[(I2+I3)+(I4+I1)] \quad (1)$$

$$Y=[(I2+I1)-(I4+I3)]/[(I2+I3)+(I4+I1)] \quad (2)$$

FIG. 4 shows the distribution of the electric field lines 30 when the voltage is applied to the electrodes at the four corners. The electric fields distributed on the position detecting electrically conductive film are nonuniform, as apparent from the fact that the electric field lines 30 are curved. The linearization pattern 22 shown in the FIG. 1 is provided to change the curved electric field lines to the lines of the uniform electric field. The linearization pattern 22 can be formed between the position detecting electrically conductive film 20 and the polarizer 24, as shown in the FIG. 1, or between the substrate 18 and the position detecting electrically conductive film 20. Various types of the linearization pattern 22 are possible, and the FIG. 5 shows one example of the linearization pattern. The electrodes 32 are provided at the four corners, and the linearization patterns 34 are provided along the edge of the position detecting electrically conductive film. FIG. 6 shows the distribution of the electric field lines or straight equipotential lines 36 in the case that the ideal linearization is realized. In the FIG. 6, the straight equipotential lines 36 are evenly spaced, in other words, the straight equipotential lines 36 are so distributed that the adjacent equipotential lines 36 are separated by an uniform space, and the above described equations (1) and (2) apply only if the equipotential lines 36 are straight and evenly spaced.

In the present invention, the position detecting electrically conductive film is integrally formed on the polarizer or the substrate which are the components of the liquid crystal display device. In the prior technology, the touch sensor having the glass substrate provided with the position detecting electrically conductive film is prepared as a separate component, and this touch sensor is mounted on the screen of the image display device such that the touch sensor overlaps the screen of the image display device. In this case, the weight of the glass substrate of the touch sensor is added to the weight of the image display device, the total thickness of the image display device is increased, the fabrication cost is increased, and the image quality is degraded by the additional interfaces. Further, there is the possibility that the touch sensor mechanically mounted to the image display device might be disengaged from the image display device due to an expected shock, so that this type of touch sensor was unsuitable for the portable type image display device.

The liquid crystal display device of the present invention is a quite preferable way to realize an image display device having the position detecting means of a high sensitivity and a high resolution. In general, the image data signals in the image display device are continuously varied. Accordingly, in the case that a very weak electrical signal is measured as performed in the present invention, the measurement is very much affected by noises due to the variation of the signals. The measurement in the case of the liquid crystal display device is also affected by the noises since the potential of the PEL electrodes is varied. However, since the potential of the common electrode is fixed or inverted at a predetermined period in the driving scheme of the electrode in the liquid crystal display device, it is possible to use the common electrode, i.e. the ITO film 14 existing between the position detecting electrically conductive film 20 and the TFT array 10, as a noise shield. Accordingly, the liquid crystal display device can realize the position detection with the extremely high precision which is not so much affected by the noises.

The inverted driving scheme is normally performed in the liquid crystal display device since if the liquid crystal is driven by a fixed DC voltage, the ions accumulate at one side of the liquid crystal layer, so that the liquid crystal is deteriorated. Even if such inverted driving scheme is used, the similar shield effects are expected. The methods for performing the inverted driving scheme are a dot inversion in which the polarity of the PEL electrode for each dot is inverted, a H inversion in which the polarity of the common electrode for each scan line is inverted, and a V inversion in which the polarity of the common electrode for each frame is inverted, etc. In the case of the dot inversion, the shield effects are expected since the potential of the common electrode is always fixed. However, in the cases of the H inversion and the V inversion, the position detecting electrically conductive film is electrically affected by the inversion since the potential of the common electrode is inverted. However, since the potential is varied at the fixed period, it is possible to precisely detect the touched position by compensating the effects of the variation. In conclusion, it is possible to shield the effects of the random variation of the potential of the PEL electrodes by the common electrode.

It is desired to integrally mount the position detecting electrically conductive film onto the substrate 18 or the polarizer 24 of the FIG. 1 to precisely compensate the electrical effects due to the inverted driving scheme. In the case that the touch sensor including the position detecting electrically conductive film is mounted on the outside of the image display device, the distance between the common electrode (i.e. the ITO film) and the position detecting electrically conductive film may change over time, so that the precise compensation can not be performed. Considering that the polarizer 24 and the substrate 18 are adhered by the adhesive in many cases, it is extremely desirable to integrally mount the position detecting electrically conductive film 20 on the substrate 18 to suppress a structural change or a generation of an internal stress due to the variation of the component material based upon a lapse of time and the temperature to the minimum level.

A thin film of any material which is transparent and has an uniform resistive value can be used as the position detecting electrically conductive film, and the examples of the material are ITO (Indium Tin Oxide), IZO (Indium Zinc Oxide) etc. These films can be formed by a physical film forming process, such as a sputtering, and a chemical film forming process, such as CVD. A preferable range of the resistive value of the position detecting electrically conductive film is 200~800 ohms/square, more preferably, 300~500-ohms/square. If the resistive value is smaller than these values, the accuracy of the position detection is degraded. If the resistive value is larger than these values, the detected current value is decreased, whereby an amplifier of high sensitivity is required.

The reasons for the degradation of the accuracy of the position detection at the resistive value smaller than the above range are, as follows. To change the curved electric field lines 30 shown in the FIG. 4 to the straight equipotential lines 36 shown in the FIG. 6, it is necessary that the linearization pattern has a sufficiently small resistive value to ensure that the electric field initially extends from one electrode along horizontally extended electrically conductive strip of the linearization pattern. It is desirable that the electrically conductive strips of the linearization pattern have the resistive values represented by the following equations.

$$R_{pattern}(\text{side}) - <0.5 R_{detect}(W/H) \quad (3)$$

$$R_{pattern}(\text{top}) - <0.5 R_{detect}(H/W) \quad (4)$$

"$R_{pattern}(\text{side})$" represents the resistive value of one of electrically conductive strips disposed at the horizontal edges of the four edges. "$R_{pattern}(\text{top})$" represents the resistive value of one of electrically conductive strips disposed at the vertical edges of the four edges. "$R_{detect}$" represents the sheet resistivity value of the position detecting electrically conductive film. "W" represents the length of the horizontal edges of the position detecting electrically conductive film. "H" represents the length of the vertical edges of the position detecting electrically conductive film. In the case of the portable liquid crystal display device, since the available space for the linearization pattern is usually only 2~3 mm, it is difficult to decrease the resistive value of the linearization pattern. For this reason, the resistive value of the position detecting electrically conductive film should be selected to a large value. Accordingly, the effects of the linearization becomes insufficient when the resistive value becomes small.

The case which is preferable in view of the fabrication process is that the position detecting electrically conductive film 20 is formed on the outside surface of the substrate 18 which is opposite to the color filter layer 16. The color filter layer 16 is initially formed on one surface of the substrate 18, the ITO film 14 is formed on the color filter layer 16, and the position detecting electrically conductive film 20 is formed on the opposite surface of the substrate 18. Either the ITO film 14 or the position detecting electrically conductive film 20 can be initially formed. Since both the position detecting electrically conductive film 20 and ITO film 14 can be formed by the similar process, such as the sputtering, the continuous process becomes possible and it causes the great advantage.

Any material which has the desired resistive value and shows a stability can be used as the material of the linearization pattern. For example, Ag, MoW, chromium oxide can be used. To form the linearization pattern, the electrically conductive material can be directly deposited, or an ink in which the electrically conductive material is dispersed in a polymer, such as an epoxy resin can be deposited. Various processes, such as a screen printing, sputtering, photo-imaging and etching, etc. can be used to form the linearization pattern.

Figure 7:
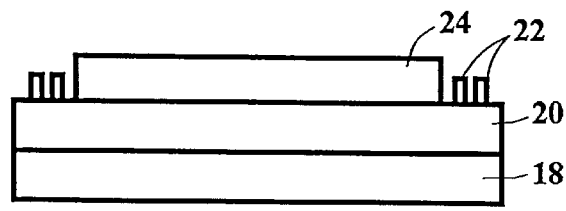
FIG. 7 shows the cross section of the structure of the liquid crystal display device of the present invention.

FIG. 7 shows another aspect of the present invention. In the FIG. 7, only the substrate 18, the position detecting electrically conductive film 20, the linearization pattern 22 and the polarizer 24 among the structure shown in the FIG. 1 are shown. The position detecting electrically conductive film 20 is formed on the substrate 18, and the linearization pattern 22 is formed on the outer peripheral region of the position detecting electrically conductive film 20. In this embodiment, the size of the polarizer 24 is smaller than the size of the position detecting electrically conductive film 20 such that the polarizer 24 is not contact the linearization pattern 22.

In an alternate embodiment, the polarizer 24 may contact the linearization pattern 22. In this case, the linearization pattern may be sufficiently thick such that the polarizer 24 does not adhere to the position detecting electrically conductive film 20 and an air gap forms between the polarizer 24 and the substrate 18. It has been confirmed that when the linearization pattern is formed by screen printing, the linearization pattern is typically sufficiently thick to form an air gap. It is possible to reduce the generation of the air gap by slanting the linearization pattern 22. In addition, the air gap can be minimized by decreasing the thickness of the linearization pattern. For example, if the thickness of the linearization pattern 22 is less than about 10:m, the generation of the air gap can be significantly reduced without using a smaller size polarizer. However, if the thickness of the linearization pattern is thinned, its resistive value becomes large, and the accuracy of the position detection is degraded. Accordingly, in this case, it is necessary to form the linearization pattern 22 using a low resistive material such as e MoW or chromium oxide or other suitable material. Such materials make it possible to form the linearization pattern 22, having the thickness of the range 0.01:m~several:m, which is suitable for the use in the present invention.

Figure 8:
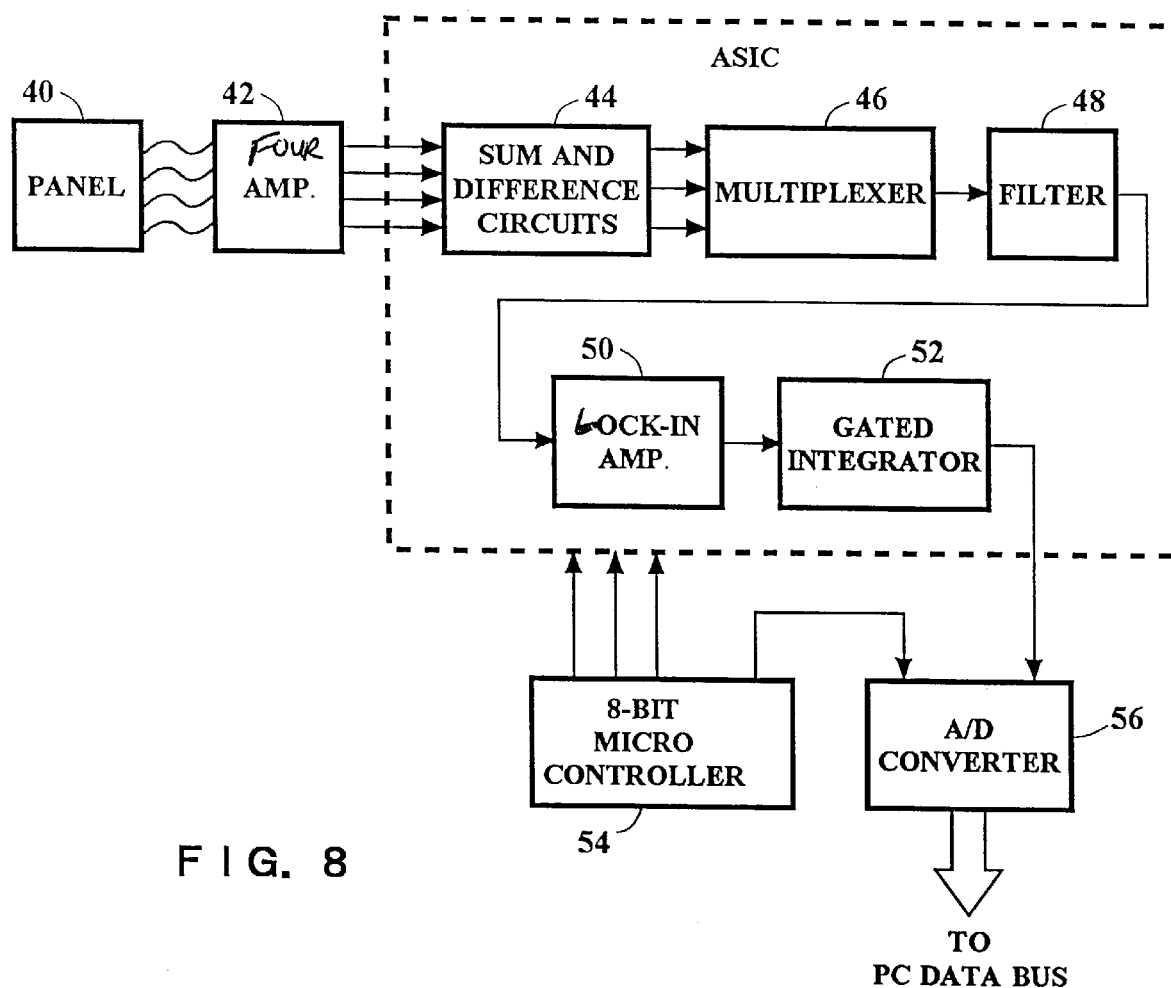
FIG. 8 shows one example of the signal processing operation in the analog capacity coupling scheme.

FIG. 8 shows one example of the signal processing operation in the present invention. The potential data measured by the electrodes at the four corners of the position detecting electrically conductive film of the image display device 40 are amplified by four low noise amplifiers 42, the values of the numerators and the denominators of the equations (1) and (2) are operatively processed in analog form by sum and difference circuits 44. These processed values are selectively sent to a filter 48, a lock-in amplifier 50 and a gated integrator 52 by a multiplexer 46, and finally converted to digital data by an A/D converter 56. The digital data are sent to a computer by which the operation based upon the equations (1) and (2) is performed to calculate the positional coordinate of the touched portion. After the positional coordinate is calculated, the positional coordinate is sent to a software driver, which typically emulates a mouse operation to perform various operations on the panel surface of the liquid crystal display device. For example, an operation for drawing a line based upon a plurality of touched portions, an operation for clicking an icon displayed at the touched portion, etc.

The present invention can detect the positional coordinate by either the finger or the touch pen. The current or the voltage can be selected as the physical amount detected at the four corners in accordance with the characteristics of the finger or the touch pen, and the physical amount detected by the finger may differ from the physical value detected by the touch pen. Different operational tables can be selectively used depending upon the finger mode or the touch pen mode. The switch between the finger mode and the touch pen mode can be performed as follows. In the finger mode, voltages are applied to the touch screen corners and the currents drawn by the finger to ground are measures. In pen mode, the voltage is applied to the pen instead of the touch screen, and the currents injected into the screen by the pen are measured. The circuit can be switched between the two methods of operation until either a finger or pen is detected.

Figure 9:
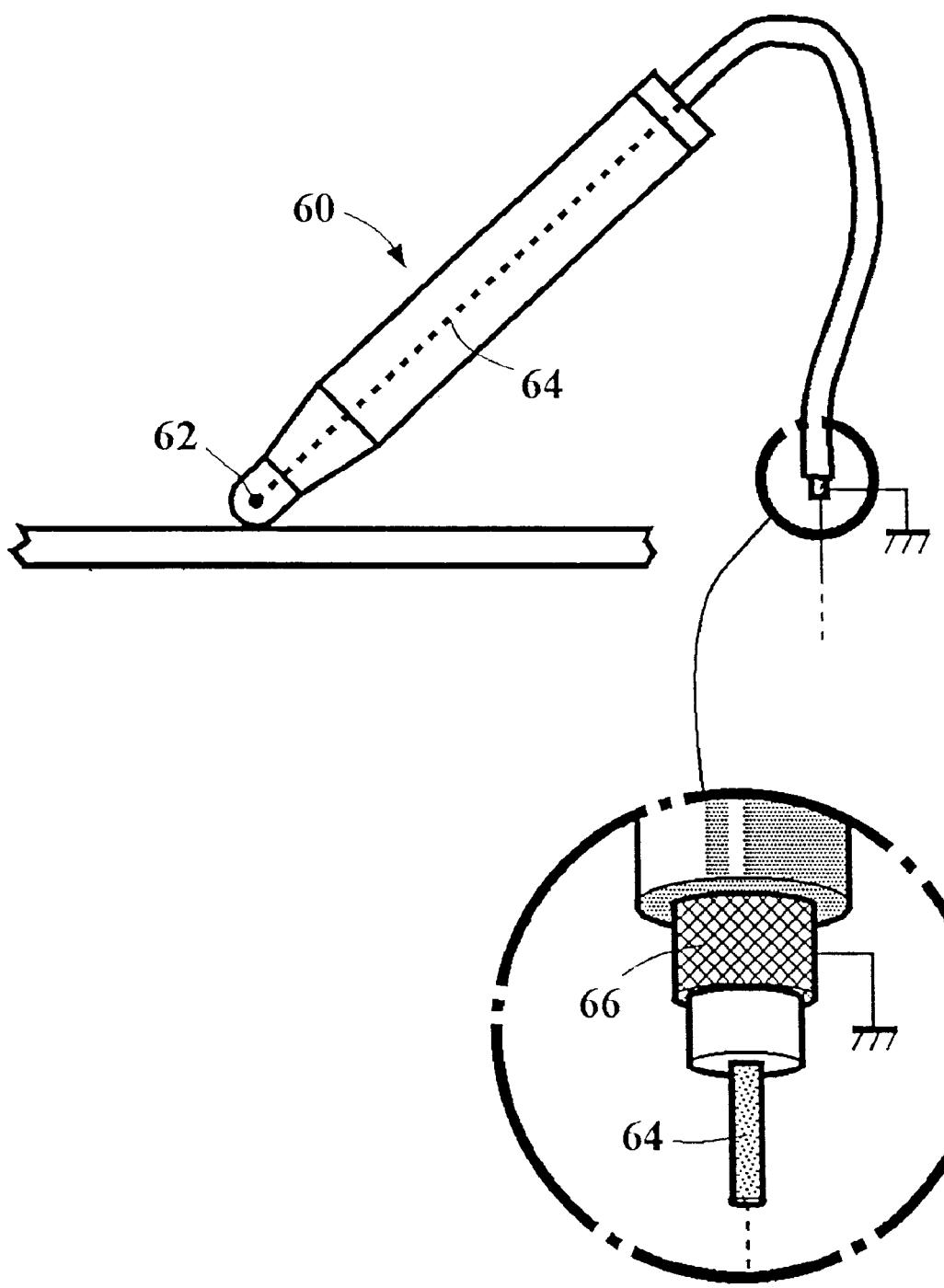
FIG. 9 shows the touch pen used in the analog capacity coupling scheme.

FIG. 9 shows a structure of the touch pen 60. It is possible to improve the precision in the detection by applying a predetermined voltage to the touch pen. A signal line 64 is surrounded by a shield cable 66. The touch pen 60 has a head portion 62 made of the electrically conductive material mounted at a leading portion. Any electrically conductive material can be used as the material of the head portion, such as a metal, an electrically conductive plastic, a plastic in which the electrically conductive material are dispersed, etc. It is preferable to use the head portion made of the material a main part of which is made of the plastic, to prevent the surface of the panel from being scratched.

The present invention can realize the thin type liquid crystal display device with the light weight, so that it becomes possible to realize the portable type liquid crystal display device. The present invention can realize the detection of the touched position with the high sensitivity and the high resolution by reducing the effects of the noises due to the variation of the image data. The present invention also can suppress the undesired generation of the air gap by reducing the effects of the rugged structure of the linearization pattern.

We claim:

1. A liquid crystal display device comprising:
a first substrate and a second substrate;
a plurality of liquid crystal cells disposed between said first and second substrates;
a polarized disposed on said first substrate on a side opposite said plurality of liquid crystal cells;
an electrically conductive film, disposed between said polarizer and said first substrate, for detecting position of an input device based upon signals applied to said film, said electrically conductive film being directly applied to said polarizer, wherein said film is continuous between edges of one of said polarizer and said first substrate, and a linearization pattern is formed on an outer peripheral region of said electrically conductive film.

2. The liquid crystal display device of claim 1, wherein said input device is a human finger, and said signals are applied directly to said film.

3. The liquid crystal display device of claim 1, wherein said input device is a touch pen, and said signals are injected into said film by said touch pen.

4. A polarizing device comprising:
a polarizer, and
an electrically conductive film integrally disposed on said polarizer for detecting position of an input device based upon signals applied to said film, wherein said film is continuous between edges of said polarizer, and a linearization pattern is formed on an outer peripheral region of said electrically conductive film.

5. The polarizer of claim 4, wherein said input device is a human finger, and said signals are applied directly to said film.

6. The polarizer of claim 4, wherein said input device is a touch pen, and said signals are injected into said film by said touch pen.

7. A liquid crystal display device comprising:
a plurality of liquid crystal cells disposed between a pair of substrates;
an electrically conductive film integrally disposed on one of said substrates for detecting position of an input device based upon signals applied to said film, wherein said film is continuous between edges of said one substrate, and a linearization pattern is formed on an outer peripheral region of said electrically conductive film.

8. The liquid crystal display device of claim 7, wherein said input device is a human finger, and said signals are applied directly to said film.

9. The liquid crystal display device of claim 7, wherein said input device is a touch pen, and said signals are injected into said film by said touch pen.

10. A liquid crystal display device comprising;
a first substrate and a second substrate;
a plurality of liquid crystal cells disposed between said first and second substrates;
a polarizer disposed on said first substrate on a side opposite said plurality of liquid crystal cells;
an electrically conductive film, disposed between said polarizer and said first substrate, for detecting position of and input device based upon signals applied to said film, said film being deposited directly on said first substrate, and wherein a linearization pattern is formed on an outer peripheral region of said film.

11. The liquid crystal display device of claim 10, wherein the size of said polarizer is smaller than size of said film such that said polarizer does not contact said linearization pattern.

* * * * *